June 23, 1931. C. W. ASBURY 1,811,740
MEAT CHOPPER
Filed Feb. 21, 1929
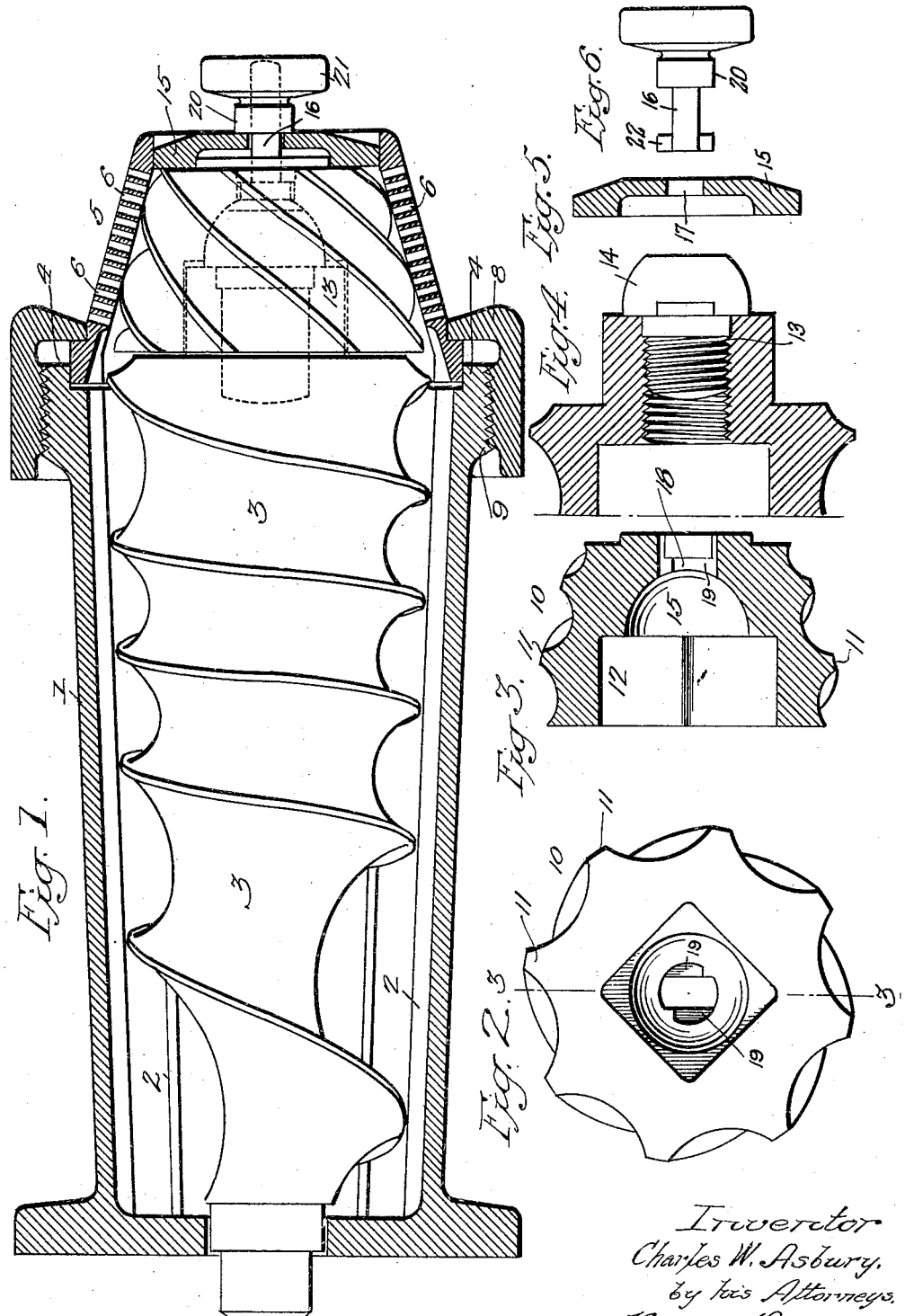
Inventor
Charles W. Asbury,
by his Attorneys Patented June 23, 1931

1,811,740

UNITED STATES PATENT OFFICE

CHARLES W. ASBURY, OF PHILADELPHIA, PENNSYLVANIA, ASSIGNOR TO THE ENTERPRISE MANUFACTURING COMPANY, OF PHILADELPHIA, PENNSYLVANIA, A CORPORATION OF PENNSYLVANIA

MEAT CHOPPER

Application filed February 21, 1929. Serial No. 341,753.

My invention relates to certain improvements in choppers for meat and like substances, in which the meat is fed to the cutters by a feed-screw, the stationary cutter being in the form of a perforated cutting head detachably secured to the end of the band of the chopper.

In this type of chopper, particularly those of large size and driven by power, the small particles of meat, bone and sinews clog the pockets at the end of the rotating cutter, and in order to relieve the cutter the entire head and the clamping ring must be removed and replaced, and if the surface is not absolutely free of meat a neat fit cannot be maintained between the cutter and the stationary cutting head.

The object of my invention is to provide means for readily removing the clogged material without detaching the cutting head. This object I attain in the following manner, reference being had to the accompanying drawings, in which—

Fig. 1 is a longitudinal sectional view of a meat chopper, showing the feed screw and conical rotating cutter;

Fig. 2 is a rear view of the rotating cutter;

Fig. 3 is a sectional view of the cutter on the line 3—3, Fig. 2;

Fig. 4 is a sectional view of one end of the feed-screw;

Fig. 5 is a detached sectional view of the cap plate; and

Fig. 6 is a side view of the securing bolt for said cap plate.

Referring to the drawings, 1 is the barrel of a meat chopper having longitudinal ribs 2, which prevent the meat turning while being fed forward by the feed-screw 3 which is driven in the ordinary manner. The end of the barrel is recessed at 4 for the reception of the inner end of the conical cutting head 5 which has a number of perforations 6.

7 is a clamping ring which secures the head to the barrel. This clamping ring has an internal flange 8 which bears against a shoulder on the cutting head and has an internal thread which meshes with the threaded portion 9 of the barrel.

10 is a conical cutter having blades 11 formed integral therewith in the present instance and arranged to cut against the inner surface of the conical head, so as to sever any meat that is projected by the force of the screw into the perforations from the body of meat carried by the cutting head. This cutting head has a rectangular recess 12 in the present instance adapted to receive the rectangular projection 13 on the end of the feed-screw 3, as the cutter must turn with the screw.

13 is a screw-stud adapted to a threaded opening in the forward end of the screw as shown in Fig. 4, and this stud has a rounded head 14 adapted to a socket 15 in the cutter. This arrangement allows the cutter to freely seat itself against the inner surface of the cutting head.

The cutting head 5 is open at its outer end and a plate 15 closes this opening and forms an abutment for the meat. This plate is held in place in the present instance by a bolt 16 which passes through an opening 17 in the plate and into an undercut socket 18 in the cutter. The opening of this socket is elongated as shown in Fig. 2 and the head 22 on the bolt 16 is also elongated to fit the opening. Then by turning the bolt a quarter turn, the head 22 will lock under the beveled flanges 19 in the head. This will draw the flange 20 on the bolt tightly against the outer surface of the closing plate 15 and hold it against any internal pressure.

On the end of the bolt is a handle 21 by which it can be turned when it is desired to attach the plate securely in place. The handle may be of any form desired, but in the present instance it is in the form of a knob.

The invention is particularly adapted to power meat choppers of large size, although it will be understood that it can be used for any size chopper.

When the meat is forced by the screw into the conical cutting head, the small particles of meat, sinew and bone that cannot pass through the perforations in the head accumulate at the outer end of the cutter and in time clog the cutter so that the work is not effective, and heretofore when this occurred the entire cutting head was removed and the gullets between the spiral cutting blades had to be cleaned and the cutting head replaced, and if the cutting head and the spiral blades were not absolutely clean, a neat fit could not be maintained between the two. The small pieces of sinew, for instance, would prevent the neat fit.

By making the end of the cutting head open and providing a detachable cap plate therefor, when the particles of bone and sinew accumulate at the end of the cutting head the plate can be readily detached and this material quickly removed without disturbing the relation between the cutter and the cutting head. After these particles have been removed, the plate can again be located in position and secured by its bolt.

I claim:

1. The combination in a chopper for meat and like substances, of a barrel; a frusto-conical perforated cutting head; means for detachably securing the cutting head to the barrel; a feed screw in the cutting head; a cutter having spiral blades and mounted on the end of the feed screw and arranged to turn therewith, the blades of the cutter extending to the end thereof, the cutting head being open at the end; a plate arranged to close said opening; and means for attaching the plate to the rotating cutter, so that on detaching the plate the clogged material can be removed.

2. The combination in a chopper for meat and like substances, of a barrel having a frusto-conical perforated cutting head open at the outer end; a feed screw in the barrel; a cutter mounted at the end of the feed screw and arranged to turn therewith, the blades of the cutter extending to its forward end; a detachable cap plate closing the opening in the end of the perforated cutting head; means for detachably securing the plate in position; a bolt extending through the plate and into a bayonet slot in the cutter; and a handle on the bolt, said bolt retaining the plate in position, so that on detaching the plate the clogged material can be removed.

CHARLES W. ASBURY.

CERTIFICATE OF CORRECTION.

Patent No. 1,811,740.  Granted June 23, 1931, to

CHARLES W. ASBURY.

It is hereby certified that the name of the assignee in the above numbered patent was erroneously described and specified as "The Enterprise Manufacturing Company", whereas said name should have been described and specified as The Enterprise Manufacturing Company of Pennsylvania, as shown by the records of assignments in this office; and that the said Letters Patent should be read with this correction therein that the same may conform to the record of the case in the Patent Office.

Signed and sealed this 4th day of August, A. D. 1931.

(Seal)

Wm. A. Kinnan,
Acting Commissioner of Patents.